US012649389B2

(12) United States Patent
Gudapati et al.

(10) Patent No.: US 12,649,389 B2
(45) Date of Patent: Jun. 9, 2026

(54) TECHNIQUES FOR MANAGING AND MAINTAINING SYSTEMIC EFFICIENCY DURING HYDROGEN REFUELING FOR FUEL CELL ELECTRIC VEHICLES

(71) Applicant: FCA US LLC, Auburn Hills, MI (US)

(72) Inventors: Abhilash Gudapati, Troy, MI (US); Rudolf Kharpuri, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 575 days.

(21) Appl. No.: 18/192,375

(22) Filed: Mar. 29, 2023

(65) Prior Publication Data

US 2024/0326655 A1      Oct. 3, 2024

(51) Int. Cl.
      *B60L 58/30*          (2019.01)
      *B60L 50/72*          (2019.01)
      *H04L 12/40*          (2006.01)
(52) U.S. Cl.
      CPC .............. *B60L 58/30* (2019.02); *B60L 50/72* (2019.02); *H04L 12/40* (2013.01); *H04L 2012/40215* (2013.01)
(58) Field of Classification Search
      None
      See application file for complete search history.

(56) References Cited

U.S. PATENT DOCUMENTS 8,492,047 B2      7/2013   Hwang et al.
9,397,362 B2 *    7/2016   Osborne ........... H01M 8/04395

11,293,595 B2 *   4/2022   Chae ....................... F17C 13/04
11,560,234 B2 *   1/2023   Morrison .......... H01M 8/04029
11,909,079 B2 *   2/2024   Morrison .......... H01M 8/04597
11,919,651 B2 *   3/2024   Morrison ............ H01M 8/0488
2014/0295305 A1 * 10/2014  Wake ....................... B60L 1/003
                                                                429/429

(Continued)

FOREIGN PATENT DOCUMENTS

CN          110936854 A  *  3/2020   .............. B60L 58/30
CN          111483319 A  *  8/2020   ............ B60L 3/0053

(Continued)

OTHER PUBLICATIONS

Translated CN-113954698-A (Year: 2025).*
International Search Report and Written Opinion dated Jun. 20, 2024 for U.S. Appl. No. 18/192,375, filed Mar. 29, 2023.

*Primary Examiner* — James A Shriver, II
*Assistant Examiner* — Ian Bryce Shelton
(74) *Attorney, Agent, or Firm* — Jeremy J. Klobucar

(57)          ABSTRACT

Refueling control techniques for a fuel cell electrified vehicle (FCEV) involve providing an electrified vehicle control unit (EVCU), a fuel cell propulsion system (FCPS), and a controller area network (CAN) therebetween, providing a set of hardwire wakeup lines connecting from the EVCU to each of the FCPS and other primary modules, and configuring the FCPS to act as a primary controller during refueling operations of the FCEV where a fuel is provided to the FCEV via a fuel hose and a fuel supply system. The EVCU is configured to act as a secondary controller during the refueling operations such that it and the other modules connected via the set of hardwire wakeup lines are able to transition to an asleep state to save low voltage power during the refueling operation.

14 Claims, 8 Drawing Sheets

(56) References Cited

U.S. PATENT DOCUMENTS

| | | | | |
|---|---|---|---|---|
| 2015/0352974 A1* | 12/2015 | Kawase | ............ | H01M 8/04373 |
| | | | | 701/22 |
| 2019/0153985 A1* | 5/2019 | Handa | ................ | F02M 21/0206 |
| 2020/0398992 A1* | 12/2020 | Morrison | ............ | H01M 8/0488 |
| 2021/0229822 A1* | 7/2021 | Morrison | .......... | H01M 8/04029 |
| 2022/0052361 A1* | 2/2022 | Morrison | .......... | H01M 8/04014 |
| 2022/0134891 A1 | 5/2022 | Yanagiura et al. | | |
| 2022/0135228 A1* | 5/2022 | Morrison | .............. | G05D 1/652 |
| | | | | 701/3 |
| 2022/0289379 A1* | 9/2022 | Morrison | .......... | H01M 8/04753 |

FOREIGN PATENT DOCUMENTS

| | | | | | | |
|---|---|---|---|---|---|---|
| CN | 112187604 A | * | 1/2021 | ....... | H04L 12/40013 |
| CN | 113954698 A | * | 1/2022 | .............. | B60L 58/30 |
| JP | 5382054 B2 | * | 1/2014 | | |
| JP | 2020093771 A | | 6/2020 | | |
| WO | 2021218711 A1 | | 11/2021 | | |

* cited by examiner

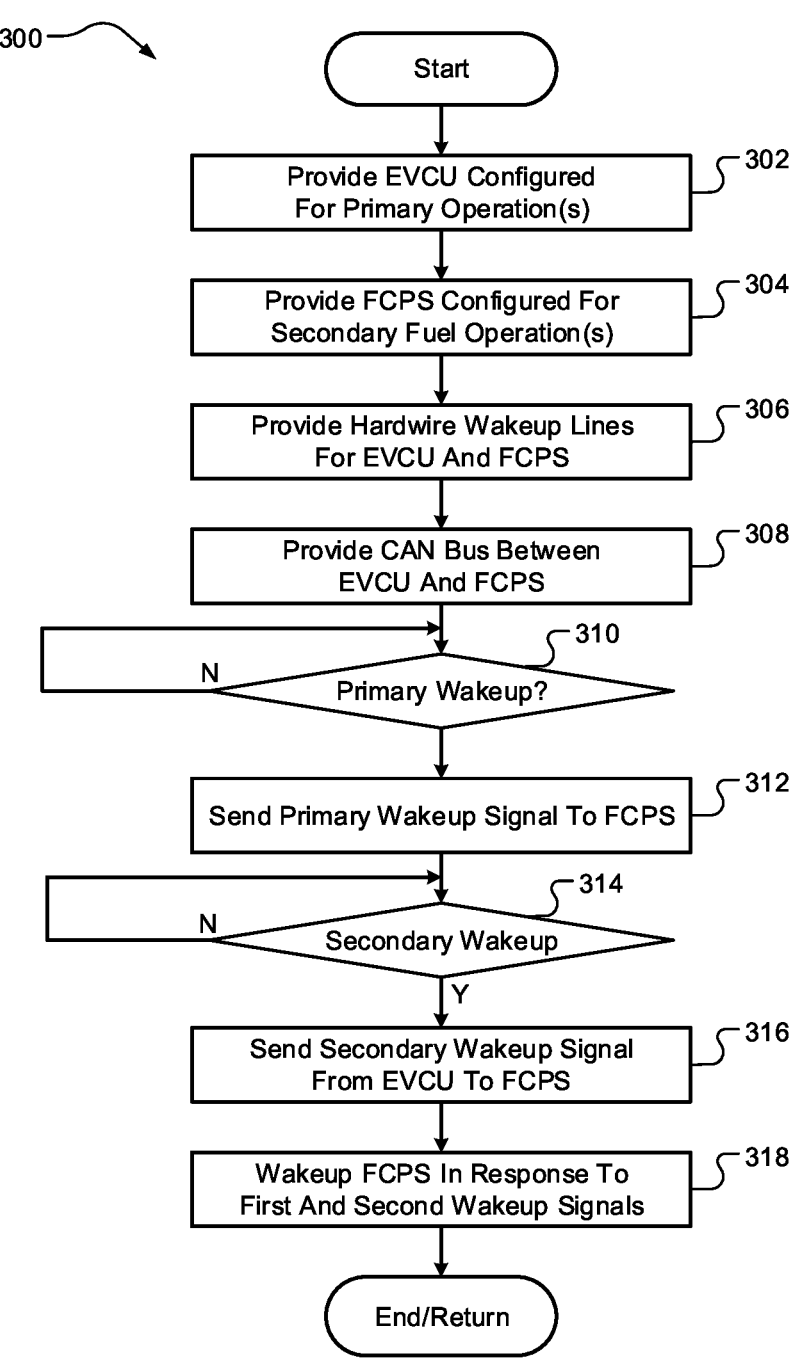

300

Start

Provide EVCU Configured
For Primary Operation(s) — 302

Provide FCPS Configured For
Secondary Fuel Operation(s) — 304

Provide Hardwire Wakeup Lines
For EVCU And FCPS — 306

Provide CAN Bus Between
EVCU And FCPS — 308

Primary Wakeup? — 310
N

Send Primary Wakeup Signal To FCPS — 312

Secondary Wakeup — 314
N
Y

Send Secondary Wakeup Signal
From EVCU To FCPS — 316

Wakeup FCPS In Response To
First And Second Wakeup Signals — 318

End/Return

TECHNIQUES FOR MANAGING AND MAINTAINING SYSTEMIC EFFICIENCY DURING HYDROGEN REFUELING FOR FUEL CELL ELECTRIC VEHICLES

FIELD

The present application generally relates to fuel cell electrified vehicles (FCEVs) and, more particularly, to communication and function management techniques for secondary controllers on multi controller area network (CAN) buses for FCEVs.

BACKGROUND

Electrified vehicles (EVs) have electrified powertrains including electric motor(s) powered by an electrical power system, such as a battery system. Some electrified powertrains further include an internal combustion engine for additional power generation, at the expense of emissions generated by the burning of a mixture of air and fuel (e.g., gasoline). One newer type of electrified vehicle is a fuel cell electrified vehicle (FCEV), which includes a fuel source (e.g., hydrogen) that is stored and selectively converted to electrical power by a fuel cell system. As this is a newer technology, conventional ("off-the-shelf") fuel cell propulsion controllers are difficult to implement in existing controller area network (CAN) architectures, typically requiring hardware and/or software changes thereby increasing complexity and costs. Accordingly, while such conventional FCEVs do work well for their intended purpose, there exists an opportunity for improvement in the relevant art.

SUMMARY

According to one example aspect of the invention, a refueling control system for a fuel cell electrified vehicle (FCEV) is presented. In one exemplary implementation, the refueling control system comprises an electrified vehicle control unit (EVCU) configured to control a set of primary operations of the FCEV, a fuel cell propulsion system (FCPS) configured to control a set of secondary operations of the FCEV relating to a fuel cell system of the FCEV, a controller area network (CAN) connecting the EVCU to the FCPS, and a set of hardwire wakeup lines connecting from the EVCU to each of the FCPS and other primary modules, wherein the FCPS acts as a primary controller during a refueling operation of the FCEV where a fuel is provided to the FCEV via a fuel hose and a fuel supply system, and wherein the EVCU acts as a secondary controller during the refueling operation such that it and the other modules connected via the set of hardwire wakeup lines are able to transition to an asleep state to save low voltage power during the refueling operation.

In some implementations, the FCPS is selectively woken up for refueling events and acts as a secondary controller to the EVCU acting as a primary controller during other operations than refueling events. In some implementations, the fuel is hydrogen and the fuel hose and fuel supply system is a hydrogen hose and a hydrogen supply system, and wherein the fuel cell system is configured to store the hydrogen fuel and convert it to electrical power for storage in a high voltage battery system of the FCEV. In some implementations, the EVCU is configured to inhibit a set of high voltage functions of the FCEV during the refueling events.

In some implementations, the low voltage power is associated with a low voltage power system that is also configured to power a set of high-power usage modules while awake. In some implementations, the set of high-power usage modules includes a telematics system, an instrument panel cluster (IPC) and an infotainment system of the FCEV. In some implementations, the FCPS is a standard off-the-shelf component and no additional hardware is required other than the hardwire wakeup lines and the CAN to selectively wakeup the FCPS.

According to another example aspect of the invention, a refueling control method for a fuel cell electrified vehicle (FCEV) is presented. In one exemplary implementation, the refueling control method comprises providing an electrified vehicle control unit (EVCU) configured to control a set of primary operations of the FCEV, providing a fuel cell propulsion system (FCPS) configured to control a set of secondary operations of the FCEV relating to a fuel cell system of the FCEV, providing a controller area network (CAN) connecting the EVCU to the FCPS, providing a set of hardwire wakeup lines connecting from the EVCU to each of the FCPS and other primary modules, configuring the FCPS to act as a primary controller during refueling operations of the FCEV where a fuel is provided to the FCEV via a fuel hose and a fuel supply system, and configuring the EVCU acts as a secondary controller during the refueling operations such that it and the other modules connected via the set of hardwire wakeup lines are able to transition to an asleep state to save low voltage power during the refueling operation.

In some implementations, the method further comprises selectively waking up the FCPS for refueling events and configuring the FCPS to act as a secondary controller to the EVCU acting as a primary controller during other operations than refueling events. In some implementations, the fuel is hydrogen and the fuel hose and fuel supply system is a hydrogen hose and a hydrogen supply system, and wherein the fuel cell system is configured to store the hydrogen fuel and convert it to electrical power for storage in a high voltage battery system of the FCEV. In some implementations, the method further comprises inhibiting, by the EVCU, a set of high voltage functions of the FCEV during the refueling events.

In some implementations, the low voltage power is associated with a low voltage power system that is also configured to power a set of high-power usage modules while awake. In some implementations, the set of high-power usage modules includes a telematics system, an instrument panel cluster (IPC) and an infotainment system of the FCEV. In some implementations, the FCPS is a standard off-the-shelf component and no additional hardware is required other than the hardwire wakeup lines and the CAN to selectively wakeup the FCPS.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIGS. 3A-3C are flow diagrams of example primary and secondary controller management methods for a control system of an FCEV according to the principles of the present application.

DESCRIPTION

As previously discussed, a conventional ("off-the-shelf") fuel cell propulsion system/controller for a fuel cell electrified vehicle (FCEV) is difficult to implement into existing controller area network (CAN) architectures, typically requiring hardware and/or software changes thereby increasing complexity and costs. For example, a fuel cell propulsion system (FCPS), configured to supervise a battery pack control module (BPCM), could be implemented into existing CAN architectures and hardwired to wakeup lines along with other primary controllers including an electrified vehicle control unit (EVCU), an integrated dual charge module (IDCM), and a motor control processor (MCP). In many cases, however, the FCPS does not need to be woken up when the EVCU is awake. In addition, there are scenarios, such as a lengthy refill event of fuel (e.g., hydrogen), where the FCPS needs to remain awake but the other primary controllers, such as the EVCU, do not need to be awake.

As a result, improved primary/secondary controller management and fuel refill control techniques are presented herein. In one aspect, primary and secondary controller management techniques keep the existing hardware wakeup lines (i.e., no hardware changes) but has the EVCU act as a primary controller and the FCPS act as a secondary controller for wakeup operations. More specifically, the EVCU "confirms" an FCPS wakeup by sending another wakeup signal via an existing CAN bus connection. This allows for easy integration of a generic/off-the-shelf FCPS with an existing CAN architecture without any hardware modifications and with very minimal software modifications, and also prevents the FCPS from waking up when not needed (e.g., saving power). This configuration also provides for the FCPS (and not other primary controllers, such as the EVCU) to remain awake during extended refueling events.

Figure 1:
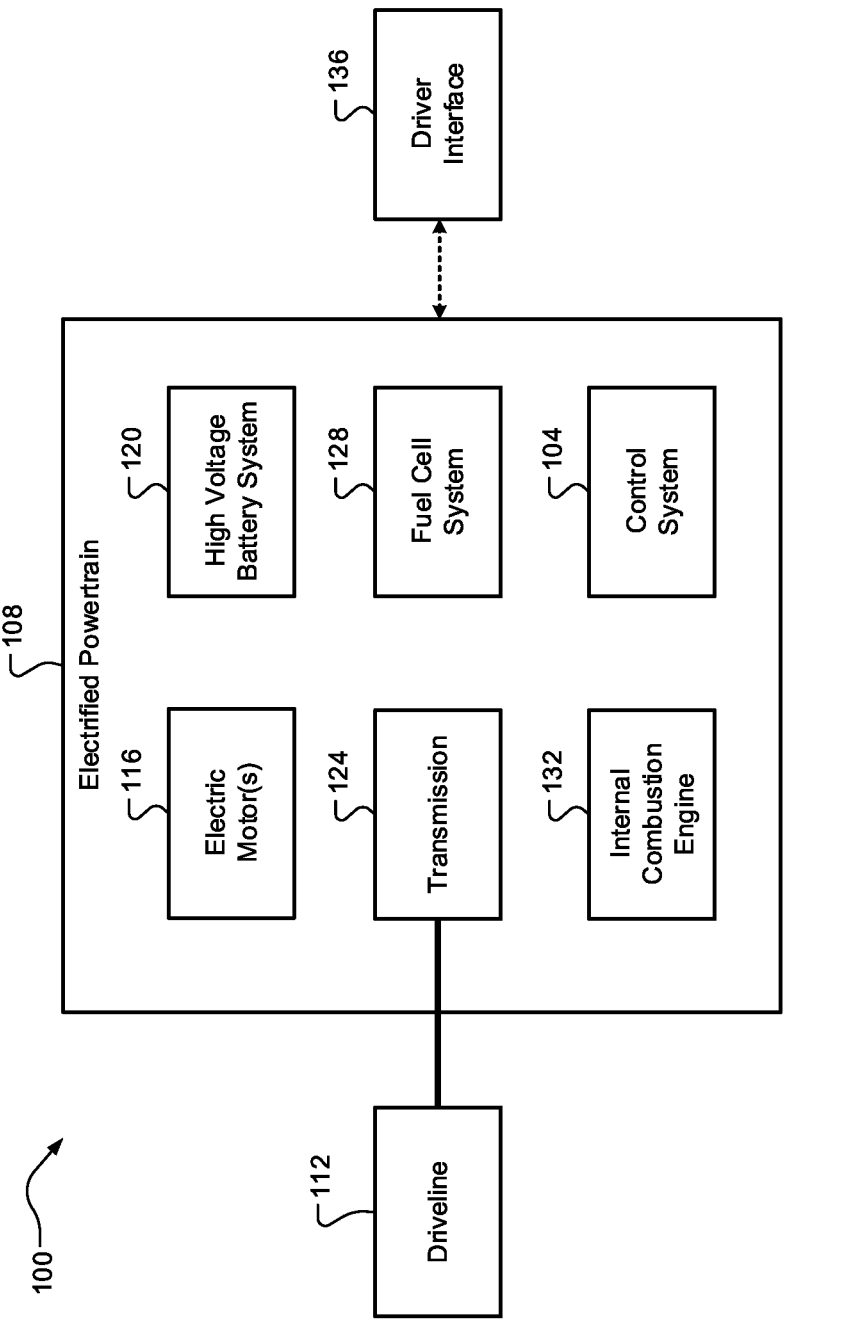
FIG. 1 is a functional block diagram of a fuel cell electrified vehicle (FCEV) having an example control system according to the principles of the present application.

Referring now to FIG. 1, a functional block diagram of a fuel cell electrified vehicle (FCEV) 100 having an example control system 104 according to the principles of the present application is illustrated. The FCEV 100 includes an electrified powertrain 108 configured to generate and transfer torque to a driveline 112 for vehicle propulsion. The electrified powertrain 108 includes one or more electric motors 116 powered by a high voltage battery system 120 and configured to generate drive torque (e.g., to satisfy a driver torque request via a driver interface 136) that is selectively transferred to the driveline 112 via a transmission 124. The high voltage battery system 120 is charged by a fuel cell system 128, which stores and converts a fuel (e.g., hydrogen) to electrical energy. In some implementations, the electrified powertrain 108 could include an optional internal combustion engine 132 that combusts a mixture of air and another fuel (e.g., gasoline) to generate power for a variety of possible uses (propulsion, electrical energy generation, etc.). It will be appreciated that the FCEV 100 could include other components, such as a low voltage (e.g., 12 volt) battery system, 140, and other non-illustrated components, such as actuator(s), sensor(s), and/or other human input/output device(s). The control system 104 controls operation of the FCEV 100 and is described in greater detail below.

Figure 2:
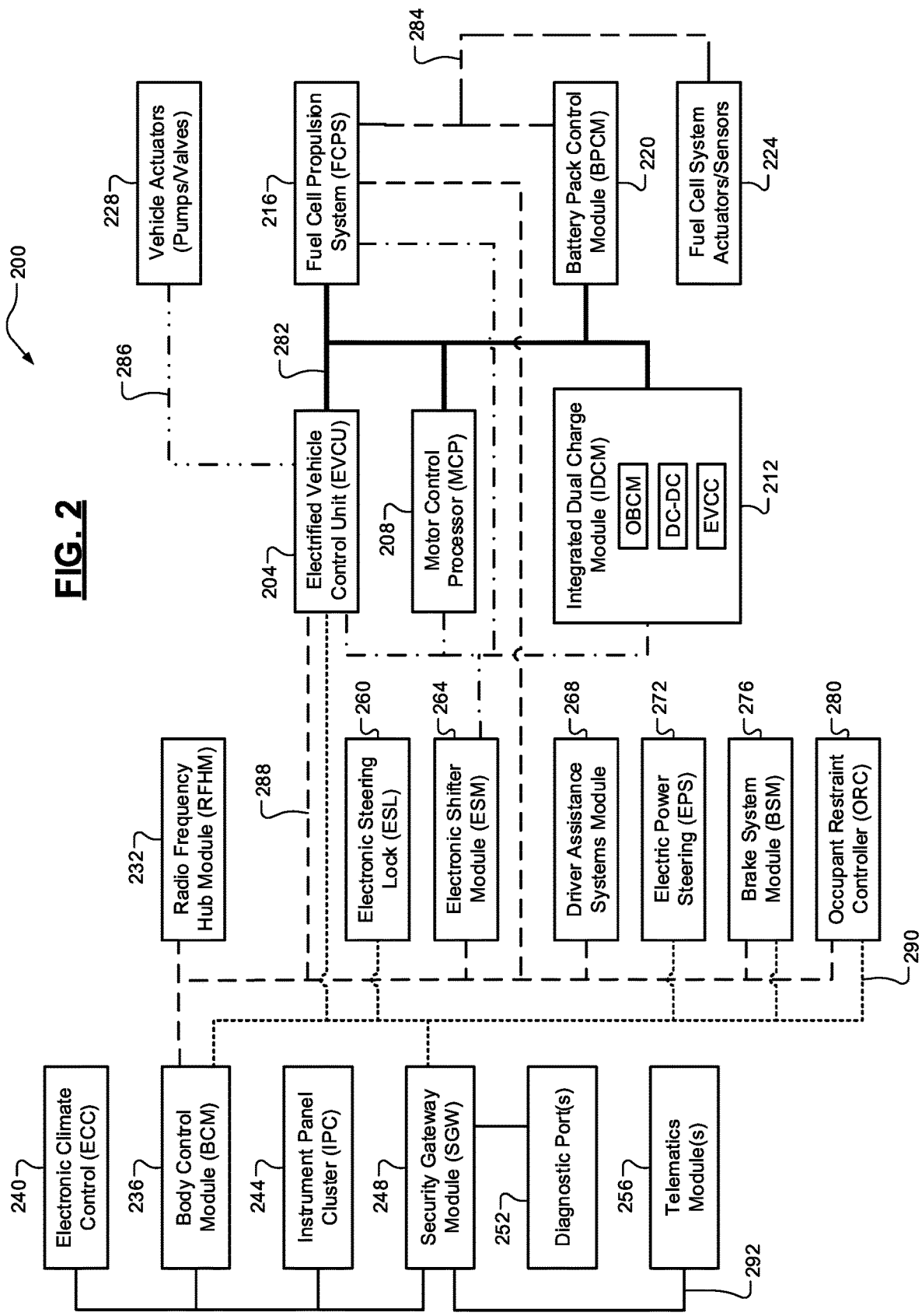
FIG. 2 is a functional block diagram of an example control architecture for a control system of an FCEV according to the principles of the present application.

Referring now to FIG. 2, a functional block diagram of an example control architecture 200 for the control system 104 of the FCEV 100 according to the principles of the present application is illustrated. While the control architecture 200 is described with respect to control system 104 of FCEV 100, it will be appreciated that the control architecture 200 could be applicable to any other suitable FCEV/control system configurations. The control system 104 includes an electrified vehicle control unit (EVCU) 204 configured to control a set of primary operations of the FCEV 100 (e.g., including vehicle actuators 228 such as pump(s)/valve(s)) and a motor control processor (MCP) 208 configured to control the electric motor(s) 116. The control system 104 also includes an integrated dual charging module (IDCM) 212 configured to control charging/recharging of the FCEV 100 and, more particularly, the high voltage battery system 120. Non-limiting example components of the IDCM 212 include an on-board charging module (OBCM), a direct current to direct current converter (DC-DC), and an electrified vehicle charge controller (EVCC). The control system 104 also includes a fuel cell propulsion system (FCPS) 216 configured to control a set of secondary operations of the FCEV 100 including communication with a battery pack control module (BPCM) 220 and other fuel system sensor(s)/actuator(s) 224. Other components of the control system 104 include a radio frequency hub module (RFHM) 232, a body control module (BCM) 236, an electronic climate control (ECC) unit 240, an instrument panel cluster (IPC) 244, a security gateway (SGW) module 248, diagnostic port(s) 252, telematics module(s) 256, an electronic steering lock (ESL) unit 260, an electronic shifter module (ESM) 264, a driver assistance systems module (DASM) 268, an electric power steering (EPS) unit 272, a brake system module (BSM) 276, and an occupant restraint controller (ORC) 280.

The above-described components are in communication via various CAN buses including, but not limited to, a hardwired wakeup line bus 282, a fuel system bus 284, an ePT bus 285, a primary EVCU bus 286, and first, second, third, and fourth CAN buses 288, 290, 292, and 294. The set of hardwire wakeup line bus 282 connects and is configured to send a primary wakeup signal from the EVCU 204 to each of the FCPS 216 and the BPCM 220, as well as to the MCP 208 and the IDCM 212. As part of the techniques of the present application, the EVCU 204 is further configured to selectively communicate a secondary wakeup signal to the FCPS 216 via the CAN (e.g., first CAN bus 288), the FCPS 216 is configured to be woken up in response to receiving both the primary and secondary wakeup signals to prevent or avoid wakeup of the FCPS 216 during a set of wakeup operations in which the FCPS 216 is not required. For example, the FCPS 216 could be selectively woken up for refueling events (i.e., fuel cell refueling events, such as hydrogen refueling). In other words, the EVCU 204 is configured to act as a primary controller and the FCPS 216 is configured to act as a secondary controller for wakeup operations.

For example only, the EVCU 204 could send the primary wakeup signal but not the secondary wakeup signal during a plurality of wakeup conditions including at least one of (1) ignition status, (2) door ajar, (3) remote start active, (4) hood ajar, (5) vehicle lock/unlock status, (6) fuel door wakeup request. (7) charge request(s), (8) diagnostic session, (9) schedule submission requests, and (10) IDCM wakeup. Also for example only, in other implementations, the EVCU 204 could send the primary wakeup signal but not the secondary wakeup signal during a plurality of wakeup conditions including (1) ignition status, (2) door ajar, (3) remote start active, (4) hood ajar, (5) vehicle lock/unlock status, (6) fuel door wakeup request. (7) charge request(s), (8) diagnostic session, (9) schedule submission requests, and (10) IDCM wakeup. It will be appreciated that these are merely example wakeup scenarios and that there could be less or more wakeup scenarios and different combinations thereof. As previously mentioned, one potential benefit to the techniques of the present application is that the FCPS 216 is able to be a standard off-the-shelf component and no additional hardware is required other than the hardwire wakeup line bus 282 and the first CAN bus 288 to selectively wakeup the FCPS 216, thereby reducing costs and complexity.

Referring now to FIG. 3A, a flow diagram of a first example primary and secondary controller management method 300 for a control system 104 of an FCEV 100 according to the principles of the present application is illustrated. While the method 300 is described with respect to the FCEV 100 and its control system 104 for illustrative and descriptive purposes, it will be appreciated that the method 300 could be applicable to any suitable FCEV and control system. At 302, the EVCU 204, configured to control a set of primary operations of the FCEV 100, is provided. At 304, the FCPS 216, configured to control a set of secondary operations of the FCEV 100 including communication with the BPCM 220, is provided. At 306, the first CAN bus 288 connecting the EVCU 204 to the FCPS 216 is provided. At 308, the hardwire wakeup line bus 282, connecting and configured to send a primary wakeup signal from the EVCU 204 to each of the FCPS 216 and the BPCM 220, is provided. At 310, the EVCU 204 determines whether the primary wakeup signal needs to be sent via the hardwire wakeup line bus 282, such as for one or more of the conditions previously described herein. When false, the method 300 ends or returns to 310. When true, the method 300 proceeds to 312 where the EVCU 204 sends the primary wakeup signal via the hardwire wakeup line bus 282. At 314, the EVCU 204 determines whether a wakeup of the FCPS 216 is necessary, such as for a refueling event. When false, the method 300 ends or returns to 314. When true, the method 300 proceeds to 316 where the EVCU 204 communicates a secondary wakeup signal to the FCPS 216 via the first CAN bus 288. At 318, the FCPS 216 is woken up in response to receiving both the primary and secondary wakeup signals via the hardwire wakeup line bus 282 and the first CAN bus 288, respectively. This prevents or avoids unnecessary wakeups of the FCPS 216, which could cause low voltage battery drain of the low voltage (e.g., 12V) battery system 140. The method 300 then ends or returns to 302 for one or more additional cycles.

Figure 3B:
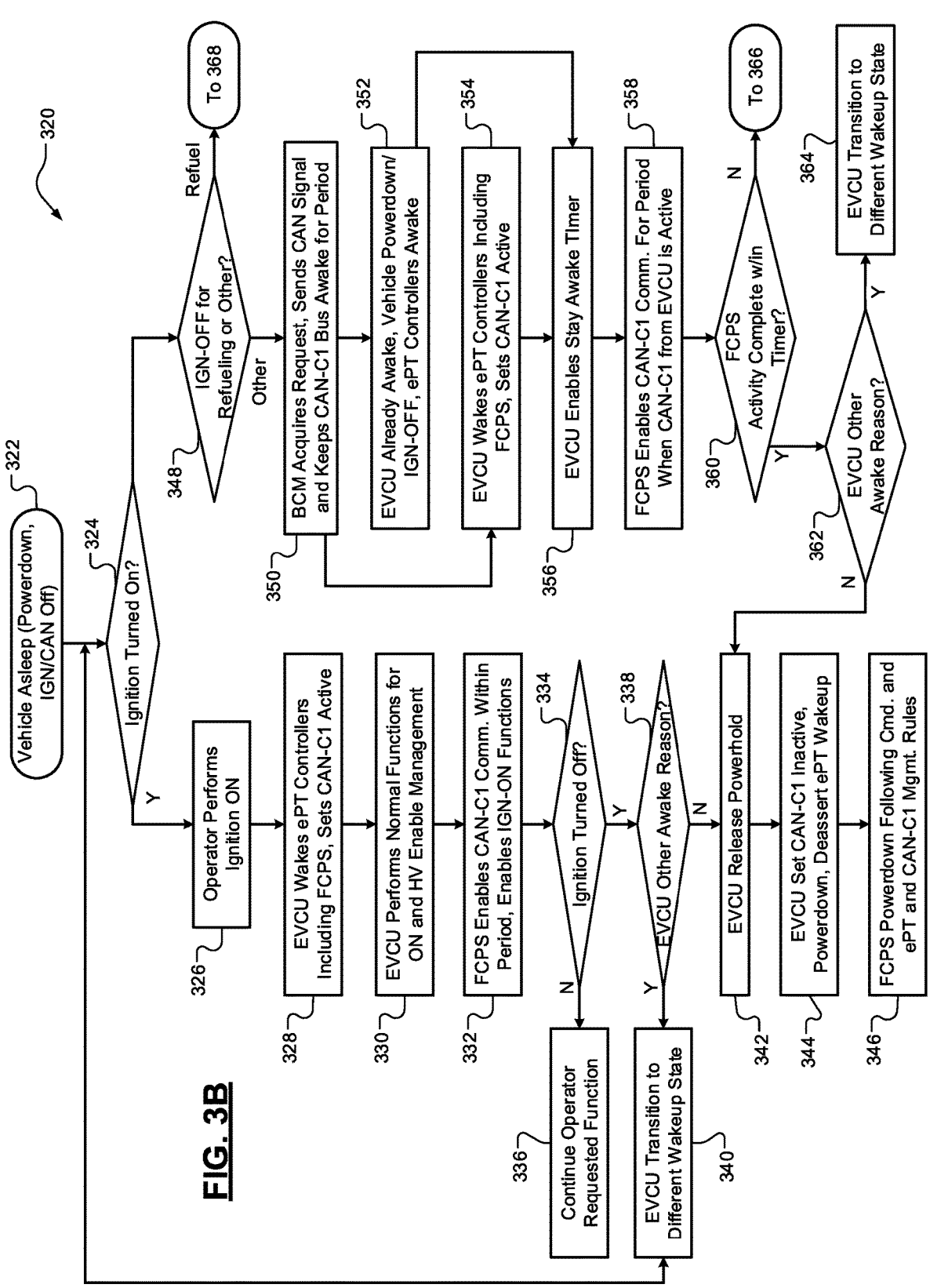
Figure 3C:
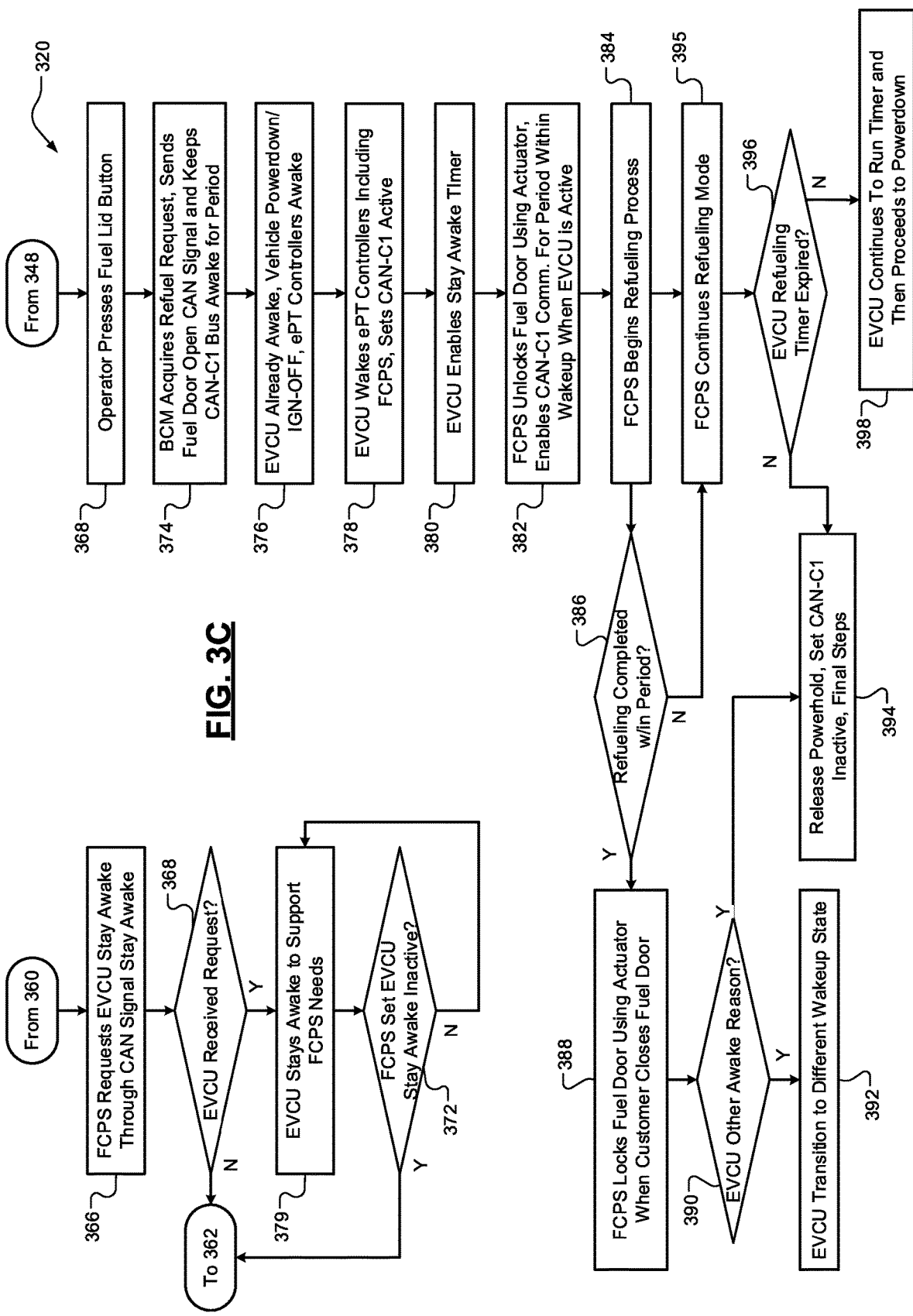

FIGS. 3B-3C illustrate a flow diagram of a second example primary and secondary controller management method 320 for a control system 104 of an FCEV 100 according to the principles of the present application is illustrated. While the method 320 is described with respect to the FCEV 100 and its control system 104 for illustrative and descriptive purposes, it will be appreciated that the method 320 could be applicable to any suitable FCEV and control system. The steps 322-398 of this method 320 are now more fully described in detail. As previously mentioned, another problem relating to refueling events occurs when integrating an off-the-shelf FCPS 216 that cannot adhere or implement specific CAN styling and requirements for a FCEV 100. Due to the CAN architecture and network rules, if the CAN bus 288 is woken up, it automatically wakes up the CAN bus 294 for the case of the FCPS 216 communicating to the IPC 244. So, in the case of adapting the same refueling requirements from previously solutions, the whole vehicle will be awake, but only the EVCU 204 and the FCPS 216 which need to participate in the refueling process are necessary. If the EVCU 204 is awake during refueling to keep the FCPS 216 awake for communication purposes, the whole ePT bus 285 would be awake due to the hardwire wakeup method used for ePT controllers and as described above. This method will critically impact the low voltage (12V) battery system 140 and due to the requirement of not having high voltage enabled during an active refueling event. It is also not in the best of interest to use high voltage to support 12V as it is inefficient. Thus, the entire FCEV 100 is typically kept awake for a worst-case refueling period (e.g., 20+ minutes) including cluster, telematics, infotainment, and the like, which are high power consuming nodes.

The newly proposed technique provides for FCPS HMI interface only when the FCPS 216 recognizes that the refueling hose (e.g., hydrogen hose) has been connected to the FCEV 100 and the refueling process is going to begin. This technique limits low voltage (12V) consumption to the maximum time the operator is going to refuel for (e.g., from a few seconds up to a maximum of ~5 minutes), which will improve the efficiency of the system and protects the low voltage (12V) battery system 140. This maximum refuel time refers to the actual time where fuel is pumping/flowing from the hydrogen (H2) fuel station to the FCEV 100. The safety requirements for hydrogen (H2) refueling are still met by the EVCU 204 by rejecting high voltage functionalities based on the EVCU-FCPS communication and the existing EVCU 204 high voltage wakeup interfaces.

Figure 4A:
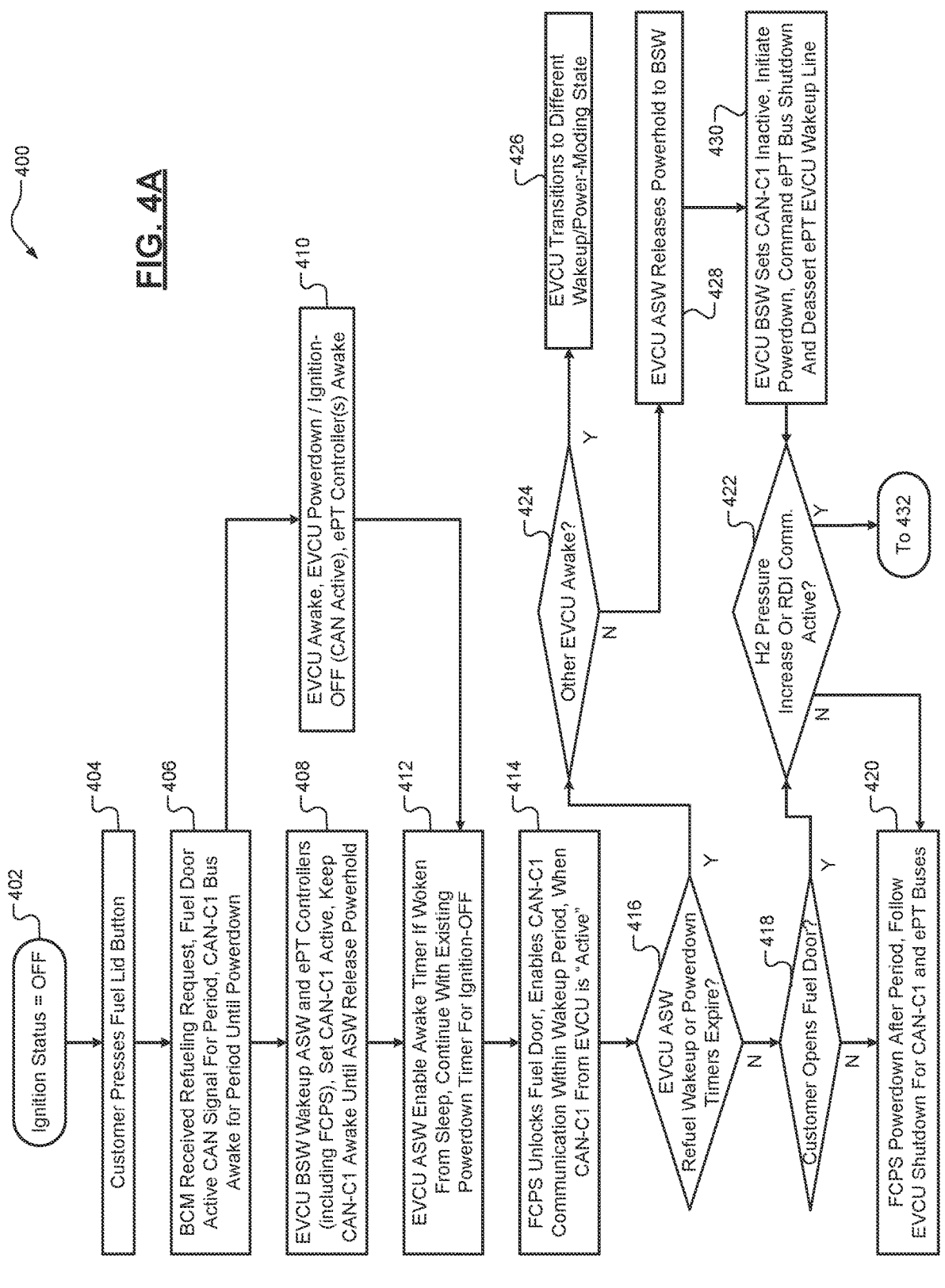
FIGS. 4A-4C are flow diagrams of example fuel refill control methods for a control system of an FCEV according to the principles of the present application.
Figure 4B:
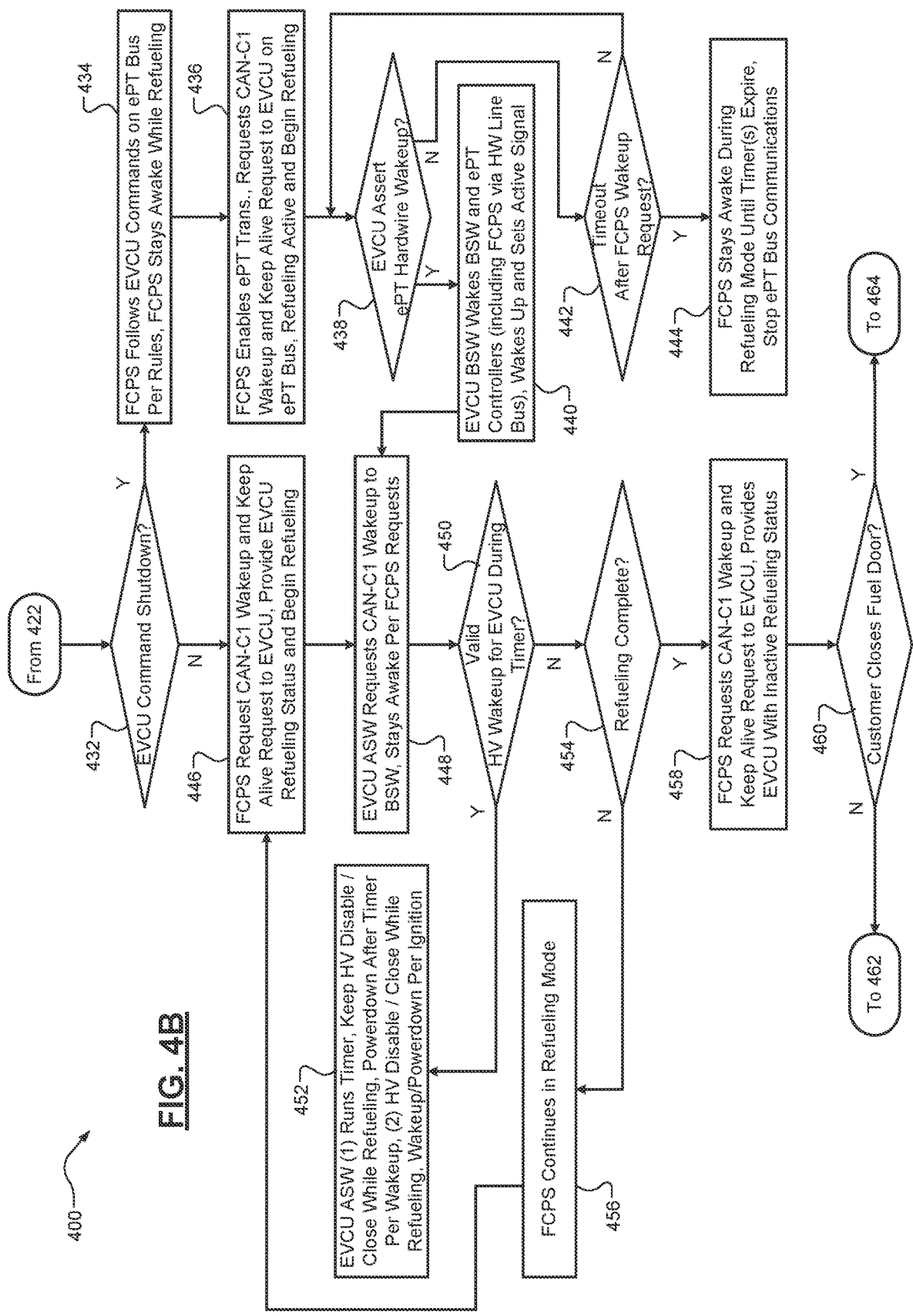
Figure 4C:
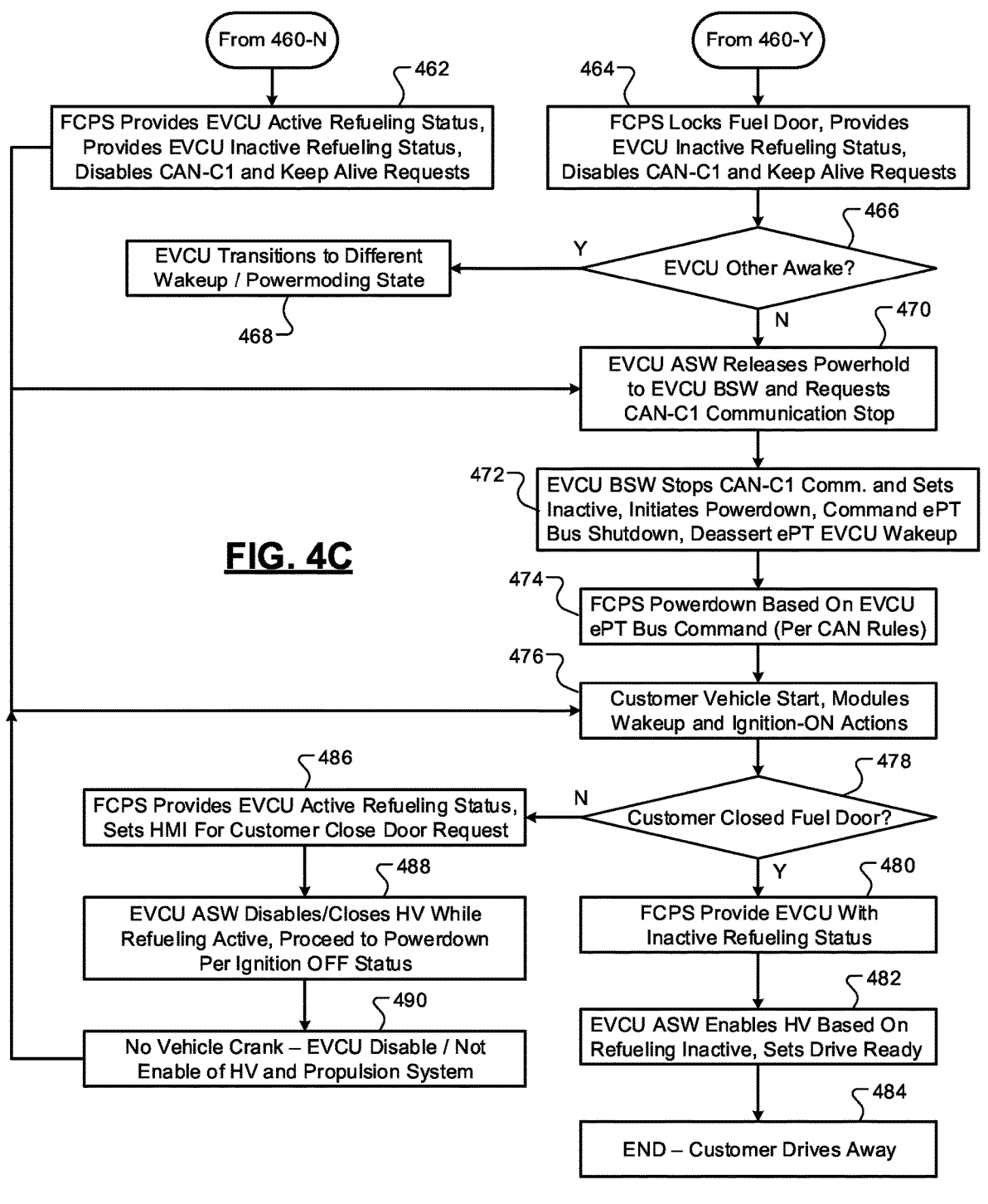

Referring now to FIGS. 4A-4C, flow diagrams of example refuel event control methods 400 for a control system 104 of an FCEV 100 according to the principles of the present application is illustrated. While the method 400 is described with respect to the FCEV 100 and its control system 104 for illustrative and descriptive purposes, it will be appreciated that the method 400 could be applicable to any suitable FCEV and control system. While one flow diagram for one method 400 is illustrated, this method 400 and its flow diagram generally cover three different methods of the present application with a few key differences. Beginning with the ignition status off (OFF) at 402, the BCM 244 acquires button press(es) through hardwire at 404. In 406-410, the BCM 244 wakes up the CAN bus 288 (if not awake) and keeps the bus awake for a period (e.g., one minute). The BCM 244 will run its maximum CAN management timer and then let the FCEV 100 go to sleep. The EVCU 204 is woken up by the BCM 244, and the EVCU 204 basic software (BSW) determines the type of wakeup reason and wakes up the EVCU 204 application software and communicates it through a CAN signal to the FCPS 216 to enable its communication within a period (e.g., 120 milliseconds) of receiving the command from EVCU 204. As illustrated in the remaining operations/decisions of 414-490, the EVCU 204 begins a timer for staying awake for a period (e.g., 50 seconds). The EVCU 204 blocks all high voltage requests for existing high voltage safety requirements during refueling. At 416, if the FCPS 216 recognizes the H2 hose is connected through a refueling data interface (RDI) interface within the 50 seconds of wakeup, the FCPS 216 will send a CAN signal "Keep Alive Request" for the EVCU 204 to stay awake to support refueling status. The FCPS 216 also requests for "CAN C1 Wakeup" for CAN bus 288 communication to continue until the hydrogen pressure decreases and refueling is completed. The EVCU 204 keeps the CAN bus 288 awake, as the EVCU 204 can wake up the CAN bus 288 and manage until the FCPS 216 stops requesting. The EVCU 204 releases the power hold after the timer expires, if keep alive is not requested by the FCPS 216. If the EVCU 204 receives a CAN Signal "Keep Alive Request" and a "CAN C1 Wakeup," the EVCU 204 will stay awake and request the EVCU 204 to keep the CAN bus 288 awake until the FCPS 216 stops requesting.

The EVCU 204 commands the FCPS 216 to stop communication on the CAN bus 288 and shuts down communication on the ePT bus 285, when the EVCU 204 releases the power hold. In case the refueling has not been started by the FCPS 216 and the EVCU 204 and the FCEV 100 has gone to sleep (i.e., only the FCPS 216 and its CAN bus is awake), the FCPS 216 continues to run its timers for worst case behavior. When the hydrogen hose is connected and the FCPS 216 recognizes through the RDI interface with the fuel pump, the FCPS 216 can request for "CAN C1 Wakeup" to the EVCU 204 on the ePT CAN bus 285 for the EVCU 204 to wake up the EVCU 204 to support the refueling process, the FCPS 216 can attempt to wakeup the EVCU for a period (e.g., 5 seconds) by waking up the ePT bus 285, and if the EVCU 204 does not assert the ePT wakeup line within the 5 seconds, the FCPS 216 shall stop transmitting on the ePT bus 285 and continue with refueling activity. If the timers expire without a need to wakeup the EVCU 204, the FCPS 216 will also power down.

In the scenario of the EVCU 204 being asleep and the FCPS 216 continuing its timers and there is a high voltage wakeup request coming in through ignition-ON or charging or real-time clock wakeup, the EVCU 204 will wakeup and reject all high voltage functionalities and stay in a specific power-moding state. In the scenario that FCPS 216 wakes up the EVCU 204 for refueling support, the EVCU 204 will wakeup the ePT controllers, call the EVCU 204, and manage the CAN wakeup as the EVCU 204 has the capability to wakeup the CAN bus 288 and manage until the FCPS 216 stops requesting. Once the FCPS 216 stops requesting "Keep Alive" and "CAN C1 Wakeup" due to the end of refueling, the EVCU 204 releases the power hold after the timer expires. The EVCU 204 commands the FCPS 216 to stop communication on CAN bus 288 and shuts down the ePT bus 285. The method 400 ends or can return to 404 for one or more additional refueling cycles.

In a first implementation of the method 400, the FCPS 216 is only awake and providing HMI interfaces for a period (e.g., 5 minutes) after the operator has pressed a refueling button. The flow this embodiment is as follows: (1) the BCM 236 acquires the button press through hardware; (2) the BCM 236 wakes up the CAN bus 288 (if not awake) and keeps the bus awake for a period (e.g., 5 minutes); (3) the EVCU 204 is woken up by the BCM 236, the EVCU 204 determines the wakeup reason and communicates it to the FCPS 216 to enable its communication within a period (e.g., 120 ms) of receiving the command from the EVCU 204); (4) the EVCU 204 begins a timer for staying awake (e.g., 290 seconds); (5) the EVCU 204 blocks all high voltage requests to meet existing enablement and safety requirements; (6) the EVCU 204 releases the powerhold after the timer expires; (7) the EVCU 204 commands the FCPS 216 to stop communicating on the CAN bus 288 and shuts down the ePT bus 285; (8) now, the FCPS 216 is the only component that is awake and stays awake until a max or worst-case refueling timer is reached (e.g., 25 minutes) for component protection or failure management and the rest of the FCEV 100 can go to sleep after the BCM 236 allows (e.g., for a period, such as 5 minutes) to help protect 12V battery drain. If the customer needs to understand why refueling is disabled, they will need to press the ignition button to check the cluster on the malfunction. If the refueling is complete within a period (e.g., 5 minutes) of the initial customer request, the behavior could be shown to the customer via HMI messaging and all modules can go to sleep by normal shutdown processes.

Another potential refueling event control technique (e.g., a future of next-generation technique) is also now described in greater detail. This method provides for FCPS-HMI interface only whenever the FCPS 216 recognizes that the hydrogen hose has been connected to the FCEV 100 and the refueling process is going to begin. This method limits 12V consumption to the maximum time the operator is going to refuel for (few seconds to a maximum of 5 mins), but also reduces the consumption by only keeping a certain CAN bus awake when needed by the FCPS 216. This technique could be a more efficient technique by using AUTOSAR CAN management used in certain FCEVs. The safety requirements for hydrogen refueling are still met by the EVCU 204 by rejecting high voltage functionalities based on the EVCU-FCPS interfaces by not even waking up the EVCU 204 for a refueling wakeup, in turn not waking up the whole ePT bus 285, but using the existing wake up interfaces to manage high voltage wakeups.

The process/flow of this technique is as follows. First (1), the BCM 236 acquires a button press through hardwire. Next (2), the BCM 236 wakes up the CAN bus 288 (if not awake) and keeps the bus awake for a period, e.g., one minute. The BCM 236 will run its maximum network management timer and then let the FCEV 100 go to sleep. Next (3), the EVCU 204 is woken up by the BCM 236, and the EVCU 204 determines the type of wakeup reason and wakes up the EVCU 204 and communicates it through a CAN signal to the FCPS 216 to enable its communication within a period (e.g., 120 milliseconds) of receiving the command from the EVCU 204. Next (4), the EVCU 204 begins a timer for staying awake for a period (e.g., 50 seconds). Next (5), the EVCU 204 blocks all high voltage requests for ant high voltage enablement requests to meet high voltage and refueling safety requirements. Next (6), if the FCPS 216 recognizes the hydrogen hose is connected through an RDI interface within the 50 seconds of wakeup, the FCPS 216 will send a CAN signal for the EVCU 204 to stay awake to support refueling status. The FCPS 204 also requests for CAN bus 288 communication to continue until the hydrogen pressure decreases and refueling is completed. The EVCU 204 keeps the CAN bus 288 awake, as the EVCU 204 can wake up the CAN bus 288 and manage until the FCPS 216 stops requesting.

Next (7), the EVCU 204 releases the power hold after the timer expires, if keep alive is not requested by the FCPS 216. If the EVCU 204 receives a CAN signal and the EVCU 204 will stay awake and request the EVCU 204 will keep the CAN bus 288 awake until the FCPS 216 stops requesting. Next (8), the EVCU 204 commands the FCPS 216 to stop communication on the CAN bus 288 and shuts down communication on the ePT bus 285, when the EVCU 204 releases the power hold. Next (9), in case the refueling has not been started by the FCPS 216 and the EVCU 204 and the vehicle 100 has gone to sleep, the FCPS 216 continues to run its timers for worst case behavior. When the hydrogen hose is connected and the FCPS 216 recognizes through the RDI interface with the fuel pump, the FCPS 216 can request for "CAN C1 Wakeup" to the EVCU 204 on the ePT CAN bus 285 for the EVCU 204 to wake up the EVCU 204 to support the refueling process, and the FCPS 216 can attempt to wakeup the EVCU 204 for a period (e.g., 5 seconds) by waking up the ePT bus 285, if the EVCU 204 does not assert the ePT wakeup line within 5 seconds, the FCPS 216 shall stop transmitting on the ePT bus 285 and continue with refueling activity. If the timers expire without a need to wakeup the EVCU 204, the FCPS 216 will also power down.

Next (10), in the scenario of EVCU 204 asleep and FCPS 216 continuing its timers and there is a high voltage wakeup request coming in, the EVCU 204 will wake up and reject all high voltage functionalities and stay in a specific power-moding state. Next (11), in the scenario that FCPS 216 wakes up the EVCU 204 for refueling support, the EVCU 204 will wake up the ePT controllers, call the EVCU 204 application software, and manage the CAN C1 wakeup as EVCU 204 has the capability to wakeup the CAN bus 288 and manage until the FCPS 216 stops requesting. Next (12), once the FCPS 216 stops requesting "Keep Alive" and "CAN C1 Wakeup" due to end of refueling, the EVCU 204 releases the power hold after the timer expires. Lastly or finally (13), the EVCU 204 commands the FCPS 216 to stop communication on the CAN bus 288 and shuts down the ePT bus 285. It is also worth noting that for both of the above-described refueling techniques, the 120 millisecond communication enable and 500 millisecond communication disable times are based on CAN management rules to avoid unintended communication errors and allow for a coordinated behavior on CAN bus 288. It will be appreciated that other enable/disable times could be utilized in different scenarios.

In yet another implementation of the method 400, the flow could be as follows: (1) the BCM 236 acquires the button presses through hardware; (2) the BCM 236 wakes up a CAN bus (e.g., CAN-FD3 bus), if not already awake, and keeps this bus awake for a short period (e.g., one minute). If the BCM 236 and vehicle buses are already awake, the BCM 236 will run its maximum network management timer and then let the FCEV 100 go to sleep; (3) the FCPS 216 is woken up by the BCM 215 or if the BCM 236 provides fueling request information, if the FCPS 216 recognizes the hose is connected through the RDI interface within a period (e.g., 50 seconds) of wakeup, the FCPS 216 starts requesting the CAN bus stay awake through AUTOSAR network management rules and sends refueling status on the CAN bus to the BCM 236 and the SGW 248, and the FCPS 216 can request for the CAN bus for communication to continue until the H2 pressure decreases and refueling is completed and this wakeup request will keep the IPC and cluster 244 awake as the IPC 244 is also a CAN-wakeable module; (4) the SGW 248 and the BCM 236 receive the refueling status CAN signal as active and will use this as a reason to only keep the CAN bus (e.g., CAN FD-3) awake and not wake up other CAN buses.

Continuing, (5) in case the refueling has not been started by the FCPS and BCM lets the vehicle go to sleep after the timer (e.g., one minute) expires or maximum CAN bus stay awake time managed by the BCM 236, the FCPS 216 continues to run its timers for worst case scenario; when the H2 hose is connected and the FCPS 216 recognizes this through the RDI interface with the fuel pump, the particular CAN bus (e.g., CAN FD-3) stays awake through AUTOSAR network management rules and sends refueling status on the CAN bus to the BCM 236 and SGW 248; the FCPS 216 can request the CAN bus for communication to continue until the H2 pressure decreases and refueling is completed and, if the timers expire without a need to wakeup the CAN bus, the FCPS 216 will also power down; (6) in the scenario of EVCU 204 is asleep and the FCPS 216 is continuing its timers and there is a HV wakeup request coming in through IGN-ON or charging or real-time clock wakeup, the EVCU 204 will wakeup and reject all HV functionalities and stay in specific powermoding state; this will be based on specific HV wakeup request which will also wake up the ePT CAN buses on which the FCPS 216 is connected and the FCPS 216 can populate the FCPS refueling status for the EVCU 204 to specifically reject HV requests; (7) once the FCPS 216 stops requesting CAN bus wakeup due to end of refueling, it can use normal AUTOSAR network management to let the CAN buses go to sleep; and finally (8) in a scenario, where the BCM 236 receives wakeup for waking up all the CAN buses, the BCM 236 can start waking up all required buses for managing other functionalities.

It will be appreciated that the term "controller" as used herein refers to any suitable control device or set of multiple control devices that is/are configured to perform at least a portion of the techniques of the present application. It will also be appreciated that the terms "unit," "module," and "processor" could also be substituted for or also refer to other "controllers." Some non-limiting examples of a "controller" include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A refueling control system for a fuel cell electrified vehicle (FCEV), the refueling control system comprising:
an electrified vehicle control unit (EVCU) configured to control a set of primary operations of the FCEV;
a fuel cell propulsion system (FCPS) configured to control a set of secondary operations of the FCEV relating to a fuel cell system of the FCEV;
a controller area network (CAN) connecting the EVCU to the FCPS; and
a set of hardwire wakeup lines connecting the EVCU and the FCPS to each other and each to other primary modules,
wherein in response to initiation of a refueling operation of the FCEV where a fuel is provided to the FCEV via a fuel hose and a fuel supply system:
the EVCU commands the FCPS, via the set of hardwire wakeup lines, to transition from a sleep state to an awake state; and
in response to transitioning to the awake state, the FCPS acts as a primary controller and the EVCU acts as a secondary controller during the refueling operation including (i) the FCPS remaining in the awake state and handling the refueling operation and (ii) the FCPS commanding the EVCU and the other primary modules, via the set of hardwire wakeup lines, to transition to the sleep state to save low voltage power during the refueling operation.

2. The refueling control system of claim 1, wherein the FCPS is selectively woken up for refueling events and acts as a secondary controller to the EVCU acting as a primary controller during other operations than refueling events.

3. The refueling control system of claim 1, wherein the fuel is hydrogen and the fuel hose and fuel supply system is a hydrogen hose and a hydrogen supply system, and wherein the fuel cell system is configured to store the hydrogen fuel and convert it to electrical power for storage in a high voltage battery system of the FCEV.

4. The refueling control system of claim 3, wherein the EVCU is configured to inhibit a set of high voltage functions of the FCEV during the refueling events.

5. The refueling control system of claim 1, wherein the low voltage power is associated with a low voltage power system that is also configured to power a set of high-power usage modules while awake.

6. The refueling control system of claim 5, wherein the set of high-power usage modules includes a telematics system, an instrument panel cluster (IPC) and an infotainment system of the FCEV.

7. The refueling control system of claim 1, wherein the FCPS is a standard off-the-shelf component and no additional hardware is required other than the hardwire wakeup lines and the CAN to selectively wakeup the FCPS.

8. A refueling control method for a fuel cell electrified vehicle (FCEV), the refueling control method comprising:

providing an electrified vehicle control unit (EVCU) configured to control a set of primary operations of the FCEV;

providing a fuel cell propulsion system (FCPS) configured to control a set of secondary operations of the FCEV relating to a fuel cell system of the FCEV;

providing a controller area network (CAN) connecting the EVCU to the FCPS;

providing a set of hardwire wakeup lines connecting the EVCU and the FCPS to each other and each to other primary modules;

in response to initiation of a refueling operation of the FCEV where a fuel is provided to the FCEV via a fuel hose and a fuel supply system:

commanding, by the EVCU via the set of hardwire wakeup lines, the FCPS to transition from a sleep state to an awake state; and in response to transitioning to the awake state, acting, by the FCPS, as a primary controller while the EVCU acts as a secondary controller during the refueling operation including (i) the FCPS remaining in the awake state and handling the refueling operation and (ii) commanding, by the FCPS via the set of hardwire wakeup lines, the EVCU and the other primary modules to transition to the sleep state to save low voltage power during the refueling operation.

9. The refueling control method of claim 8, further comprising selectively waking up the FCPS for refueling events and configuring the FCPS to act as a secondary controller to the EVCU acting as a primary controller during other operations than refueling events.

10. The refueling control method of claim 8, wherein the fuel is hydrogen and the fuel hose and fuel supply system is a hydrogen hose and a hydrogen supply system, and wherein the fuel cell system is configured to store the hydrogen fuel and convert it to electrical power for storage in a high voltage battery system of the FCEV.

11. The refueling control method of claim 10, further comprising inhibiting, by the EVCU, a set of high voltage functions of the FCEV during the refueling events.

12. The refueling control method of claim 8, wherein the low voltage power is associated with a low voltage power system that is also configured to power a set of high-power usage modules while awake.

13. The refueling control method of claim 12, wherein the set of high-power usage modules includes a telematics system, an instrument panel cluster (IPC) and an infotainment system of the FCEV.

14. The refueling control method of claim 8, wherein the FCPS is a standard off-the-shelf component and no additional hardware is required other than the hardwire wakeup lines and the CAN to selectively wakeup the FCPS.

* * * * *